(12) United States Patent
Tanaka et al.

(10) Patent No.: US 10,343,512 B2
(45) Date of Patent: Jul. 9, 2019

(54) ENGINE HEAT RETENTION STRUCTURE

(71) Applicant: Mazda Motor Corporation, Aki-gun, Hiroshima (JP)

(72) Inventors: Yukiya Tanaka, Higashihiroshima (JP); Kazumi Okamura, Hatsukaichi (JP); Shunsuke Fujitani, Hiroshima (JP); Yuhki Takanaga, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/020,067

(22) Filed: Jun. 27, 2018

(65) Prior Publication Data

US 2019/0061513 A1    Feb. 28, 2019

(30) Foreign Application Priority Data

Aug. 22, 2017    (JP) .................................. 2017-159186

(51) Int. Cl.
*B60K 11/08*    (2006.01)
*B60K 11/06*    (2006.01)

(52) U.S. Cl.
CPC .............. *B60K 11/08* (2013.01); *B60K 11/06* (2013.01)

(58) Field of Classification Search
None
See application file for complete search history.

(56) References Cited

U.S. PATENT DOCUMENTS

| | | | |
|---|---|---|---|
| 2012/0024611 A1* | 2/2012 | Ajisaka | B60K 11/08 180/68.1 |
| 2013/0059519 A1* | 3/2013 | Tajima | B60K 11/04 454/152 |
| 2013/0146376 A1* | 6/2013 | Nam | B60K 11/06 180/68.1 |
| 2017/0050509 A1* | 2/2017 | Aizawa | B60K 11/085 |
| 2018/0093561 A1* | 4/2018 | Wendelmuth | B60K 11/08 |

FOREIGN PATENT DOCUMENTS

| | | | |
|---|---|---|---|
| JP | 2013119384 A | 6/2013 | |
| JP | 2013203157 A | 10/2013 | |
| JP | 2017013638 A | 1/2017 | |
| JP | 2017114356 A * | 6/2017 | ............. B60K 11/08 |
| JP | 6304280 B2 * | 4/2018 | |

* cited by examiner

*Primary Examiner* — Joseph M Rocca
*Assistant Examiner* — Hilary L Johns
(74) *Attorney, Agent, or Firm* — Allerman Hall Creasman & Tuttle LLP

(57) ABSTRACT

A vehicle is provided, which includes an engine bay having an upper wall, side walls, a front wall, and a rear wall, an engine disposed inside the engine bay, an upper lid part disposed inside the engine bay and covering the engine from above, a shroud disposed inside the engine bay and formed in a frame shape having an opening disposed forward of the engine, and a grille shutter provided to the shroud and configured to open and close the opening. A front end of the upper lid part is placed on an upper side of the shroud, and the grille shutter is closed when an ignition is off.

4 Claims, 8 Drawing Sheets

ENGINE HEAT RETENTION STRUCTURE

TECHNICAL FIELD

The present disclosure relates to a heat retention structure of an engine, which is provided with an upper lid part covering the engine at least from above, and where a shroud is disposed forward of the engine.

BACKGROUND OF THE DISCLOSURE

In order to improve fuel consumption by shortening the warm-up time at a restart of an engine, and to reduce wear of a transmission by securing a heat-retaining property (lubricity) of engine oil, an art has already been known, as disclosed in JP2013-119384A, related to an engine encapsulating structure which improves the engine heat-retaining property by covering the engine at least from above and the side with a cover.

JP2013-119384A discloses a structure in which an upper surface cover 111 covers engine from above, a frame shroud is disposed forward of the engine (e.g., see FIG. 3 of JP2013-119384A), and a front end of the upper surface cover 111 is placed on an upper side (carrier 13) of the shroud. A frame shutter holding member (cooling duct 25) is disposed forward of the shroud and rearward of a bumper face, and the shutter holding member is provided with a plurality of grille shutters which enable a traveling air introducing opening of the bumper face to open and close (see FIGS. 1 and 3 of JP2013-119384A).

However, according to this structure, since the frame shutter holding member is disposed so as to be separated forward from the shroud, heat easily escapes through a gap in the vehicle longitudinal directions between the shutter holding member and the shroud. Moreover, since the shutter holding member is not generally formed as strong as the shroud which is structured to support a radiator and the front end of the upper surface cover (upper lid part), it tends to be formed in a thinner frame shape than the shroud, resulting in poor heat retention performance. Therefore, there is room for improvement related to heat retention efficiency of the structure forward of the engine.

Further, since this structure is provided with the frame shutter holding member forward of the engine in addition to the shroud, the number of components may increase to push up the cost and the weight.

SUMMARY OF THE DISCLOSURE

The present disclosure is made in view of such a situation, and one purpose thereof is to reduce cost and the weight while improving heat retention efficiency forward of an engine, and to enable an efficient encapsulation ranging from above to front of the engine by an upper lid part and a shroud provided with a grille shutter.

According to one aspect of the present disclosure, a vehicle is provided, which includes an engine bay having an upper wall, side walls, a front wall, and a rear wall, an engine disposed inside the engine bay, an upper lid part disposed inside the engine bay and covering the engine from above, a shroud disposed inside the engine bay and formed in a frame shape having an opening disposed forward of the engine, and a grille shutter provided to the shroud and configured to open and close the opening. A front end of the upper lid part is placed on an upper side of the shroud, and the grille shutter is closed when an ignition is off.

According to this configuration, an efficient encapsulation ranging from above to the front of the engine is possible by the upper lid part and the shroud provided with the grille shutter.

That is, covering (encapsulating) from above to the front of the engine by the upper lid part and the shroud improves efficiency in terms of weight and cost.

The vehicle may further include a dedicated heat retention member disposed inside the engine bay, and comprised of the upper lid part, the shroud, the grille shutter, and side wall parts covering sides of the engine.

The grille shutter may be provided to the shroud at a rear side.

According to this configuration, since the grill shutter is provided to the shroud at the rear side, the grill shutter can be disposed closer to the engine than a case where it is provided at the front side, and thus, the grill shutter improves the heat retention efficiency forward of the engine.

The opening formed in the shroud may include a plurality of openings, and the grille shutter may include a plurality of grille shutters corresponding to the plurality of openings. The vehicle may include a grille shutter unit having shutter holding parts holding the grille shutters. The plurality of shutter holding parts may be directly attached to the shroud.

According to this configuration, the weight of the holding structure of the grill shutter is reduced, while suppressing heat loss forward of the engine.

A width of the opening of the shroud in vehicle width directions may be smaller than a width of a traveling air introducing opening of a bumper face in the vehicle width directions, the bumper face being located forward of the shroud.

According to this configuration, by providing the grill shutter to the shroud side and opening and closing the opening provided to the shroud by the grill shutter, the width of the grill shutter can be reduced rather than the grill shutter provided to the bumper face side and opening and closing the traveling air introducing opening of the bumper face by the grill shutter.

DETAILED DESCRIPTION OF THE DISCLOSURE

Figure 1:
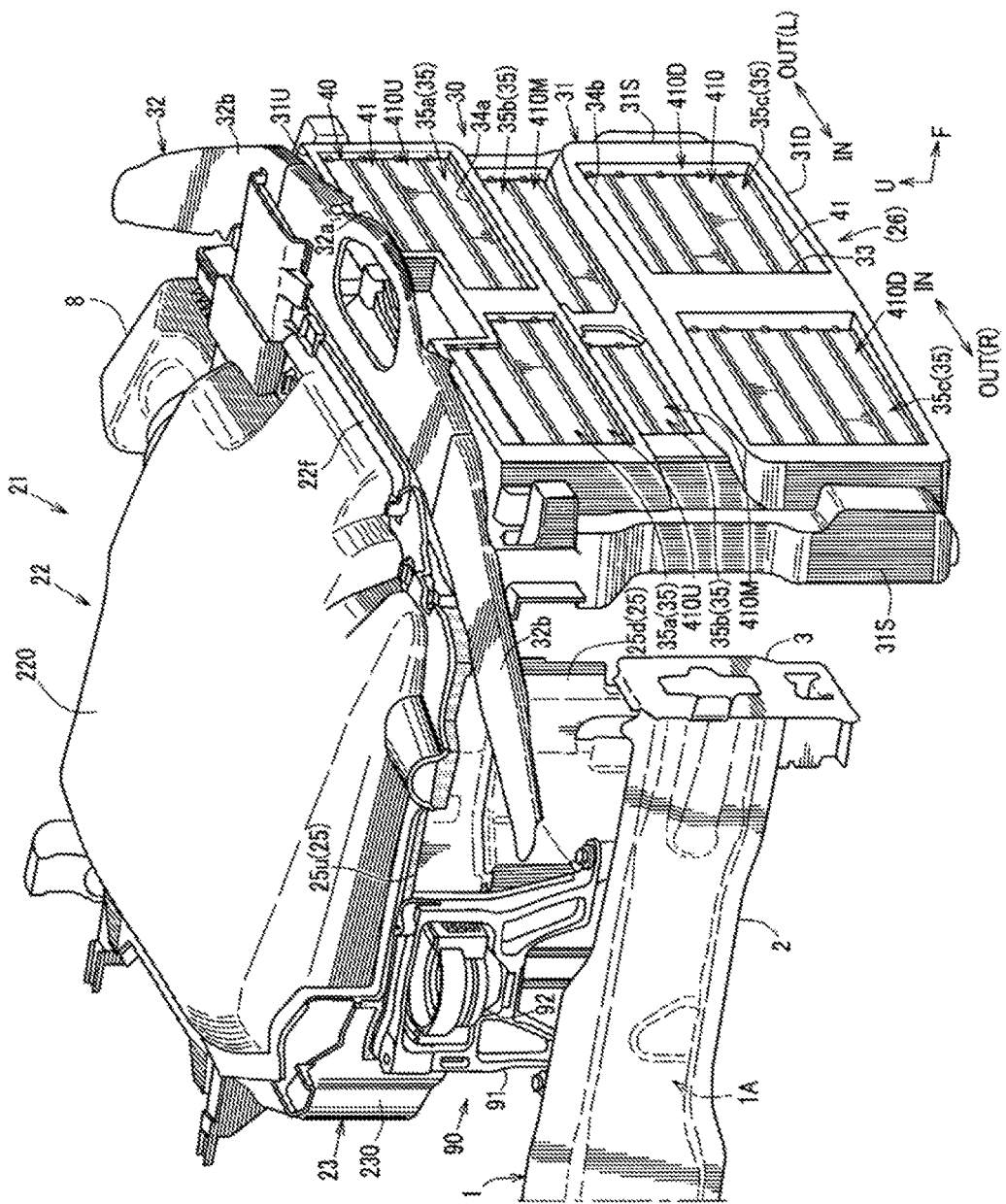
FIG. 1 is a perspective view illustrating a heat retention structure of an engine according to one embodiment of the present disclosure.

Hereinafter, one embodiment of the present disclosure is described in detail based on the accompanying drawings. Prior to description of a heat retention structure of an engine, a body structure of a vehicle is first described. Note that in the drawings, an arrow F indicates "forward" of the vehicle, an arrow U indicates "upward" of the vehicle, an arrow IN indicates "inward" in vehicle width directions, an arrow OUT indicates "outward" in the vehicle width directions, an arrow R indicates "rightward" of the vehicle, and an arrow L indicates "leftward" of the vehicle.

Figure 2:
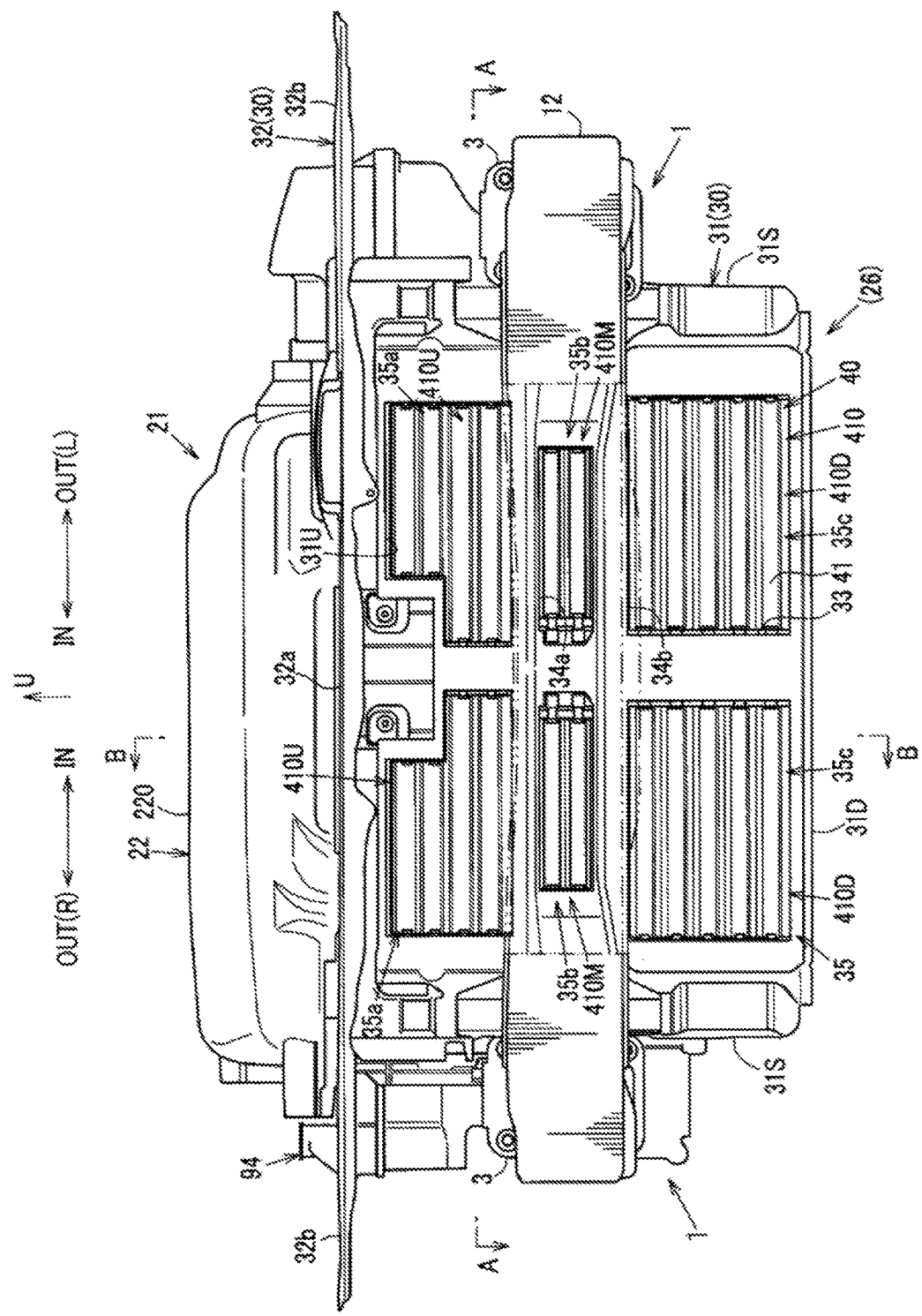
FIG. 2 is a front view of the heat retention structure.

As illustrated in FIGS. 1 and 2, inside an engine bay, a pair of left and right front side frames 1 extending forward of the vehicle from a dash lower panel are provided outward in the vehicle width directions of both the left and right sides (left and right wall parts 24 and 25 described later) of the heat retention structure of the engine. Note that in FIG. 1, for convenience of illustration, only the front side frame 1 on the right side of the vehicle is illustrated, and illustration of a bumper beam 12 (described later) is omitted. The engine bay has walls formed by various components of the vehicle body. As shown in dashed lines in FIGS. 3 and 5, the engine bay includes, for example, an upper wall formed by a hood (bonnet) of the vehicle, two side walls formed by left and right apron panels and fender panels of the vehicle, a front wall formed by a front bumper of the vehicle, and a rear wall formed by a dash panel of the vehicle.

This front side frame 1 is a vehicle body reinforcement member provided with a closed cross-section 1A extending in longitudinal directions of the vehicle, where the closed cross-section 1A is formed by fixedly joining respective upward and downward flange parts of a front side frame inner (not illustrated) of a hat shape of which a cross-section perpendicular to the vehicle longitudinal directions is convex inwardly in the vehicle width directions, and a plate-like front side frame outer 2 (see FIG. 1). A set plate 3 for attaching a crash can is formed at a front end of the front side frame 1 (see FIGS. 1 and 2).

Figure 3:
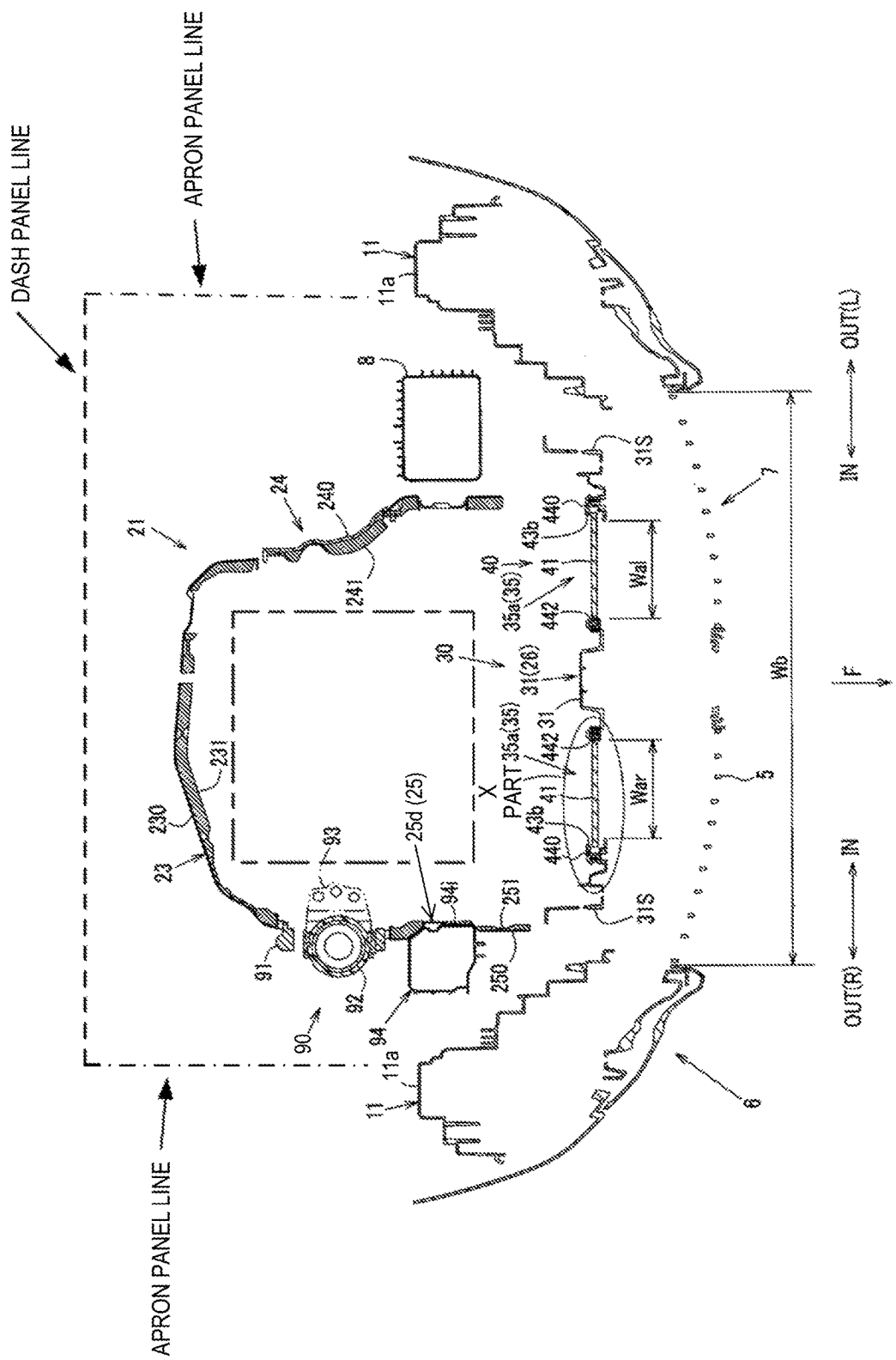
FIG. 3 is a cross-sectional view taken along a line A-A of FIG. 2.

As illustrated in FIG. 3, a foremost part of the vehicle which is forward of the engine bay located in a front part of the vehicle is covered with a front bumper face 6 (hereinafter, referred to as "the bumper face 6") provided with a front grille 5. A front surface opening 7 for introducing traveling air (fresh air) into the engine bay is formed in the front surface of the bumper face 6, at the center in the vehicle width directions. The front surface opening 7 is covered with the front grille 5 which is perforated to allow the traveling air to pass therethrough.

Moreover, as illustrated in FIG. 2, the bumper beam 12 for attaching a front bumper (not illustrated) is disposed rearward of the bumper face 6. The bumper beam 12 extends in the vehicle width directions, and both ends thereof are coupled at rear surfaces to front ends of the left and right front side frames 1 extending in the vehicle longitudinal directions through crash cans (not illustrated) as coupling members.

Meanwhile, as illustrated in FIGS. 1 to 4, the heat retention structure of this embodiment is provided with a heat retention member 21 covering the perimeter of the engine.

The heat retention member 21 is comprised of an upper lid part 22 covering the engine from above, and heat retention wall parts (23, 24, 25, and 26) covering the sides of the engine (a rear surface, a left surface, a right surface, and a front surface). That is, the heat retention wall parts (23, 24, 25, and 26) is comprised of a rear wall part 23, a left wall part 24, a right wall part 25, and a front wall part 26, which cover the rear surface, the left surface (i.e., the left surface when facing forward of the vehicle), the right surface (similarly, the right surface), and the front surface of the engine, respectively. Note that illustration of the engine is omitted in the drawings. Moreover, reference character 11a in FIG. 3 indicates a lamp housing of a head lamp unit 11, and reference character 8 indicates an air cleaner.

Figure 5:
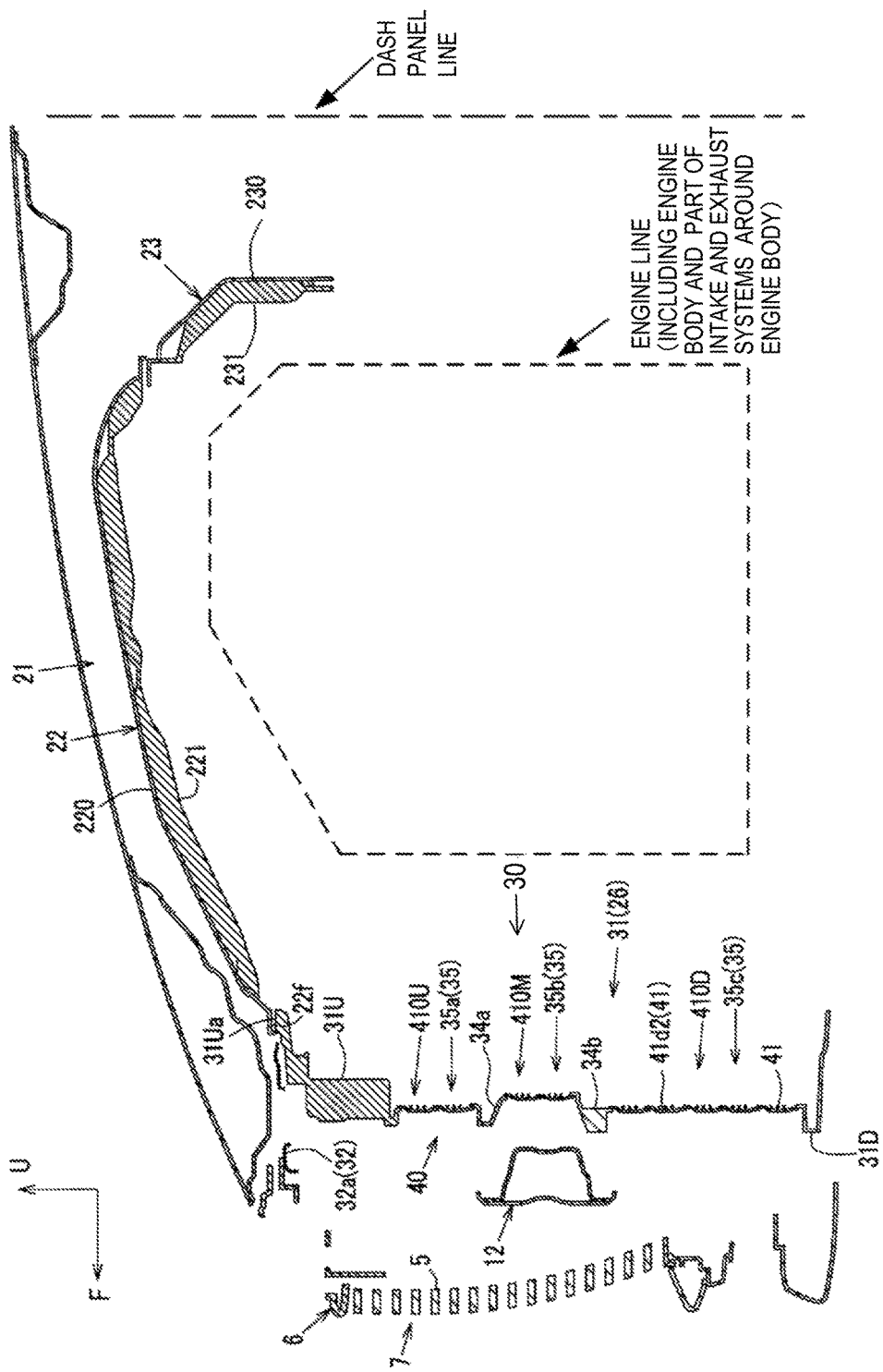
FIG. 5 is a cross-sectional view taken along a line B-B of FIG. 2.

As illustrated in FIGS. 2 and 5, the upper lid part 22 is provided with an upper surface cover 220 made of synthetic resin as an outer cover entirely covering the engine from above, and a heat retention material 221 made of glass wool, urethane, etc. integrally provided to an inner surface of the upper surface cover 220. As illustrated in FIG. 5, the upper lid part 22 is pivotally supported at a rear end thereof by an upper end of the rear wall part 23 to be openable and closable above the engine.

In a state where the upper lid part 22 closes above the engine, a front end 22f of the upper lid part 22 is placed on an upper surface 31Ua of an upper member 31U of a shroud panel 31.

As illustrated in FIGS. 3 and 5, the rear wall part 23 is provided with a rear surface cover 230 made of synthetic resin as an outer cover entirely covering the rear side of the engine, and a heat retention material 231 made of glass wool, urethane, etc. integrally provided to an inner surface of the rear surface cover 230.

As illustrated in FIG. 3, the left wall part 24 is provided with a left surface cover 240 made of synthetic resin as an outer cover entirely covering the left side of the engine in the vehicle width directions, and a heat retention material 241 made of glass wool, urethane, etc. integrally provided to an inner surface of the left surface cover 240.

The upper lid part 22, the rear wall part 23, and the left wall part 24 are provided for exclusive use as the heat retention members.

As illustrated in FIGS. 1 and 3, a heat retention wall part, which corresponds to the right-side surface of the engine, is comprised of an engine mount bracket 90 which constitutes a rear part of the right-side surface, and the right wall part 25 which constitutes a front part of the right-side surface and is provided for exclusive use as the heat retention member.

As illustrated in FIG. 1, the engine mount bracket 90 is disposed in a rear part on the right side of the engine to support the mount of the engine by the front side frame 1 which is the vehicle body reinforcement member.

As illustrated in FIGS. 1 and 3, the engine mount bracket 90 is provided with a mount bracket main body 91 of a vertical-wall shape (mount bracket on the vehicle body side), a mount rubber 92 as a buffer member, and an arm part 93 (see FIG. 3) (mount bracket on the engine side) which extends inwardly in the vehicle width directions (toward the engine) to support the engine.

In this embodiment, the rear part of the right-side surface of the engine is substituted by the engine mount bracket 90 to partially omit the right wall part 25, and the right wall part 25 is provided as the dedicated heat retention member 21 to the front part of the right-side surface, to reduce the total weight and the cost of the heat retention member 21 in the right-side surface.

As illustrated in FIGS. 2 and 3, the right wall part 25 is mounted to and supported by a subtank 94 disposed forward of the engine mount bracket 90 on the right side of the engine so that it is disposed adjacently to and inward of an inner wall part 94i in the vehicle width directions (see FIG. 3) of the subtank 94. As illustrated in FIG. 1, the right wall part 25 covers the front part on the right side of the engine. Note that illustration of the subtank 94 is omitted in FIG. 1.

The subtank 94 is a subtank for the radiator, and although illustration is omitted, a lower part of the subtank 94 is directly attached to and supported by the front side frame 1, and an upper part of the subtank 94 is indirectly attached to and supported by a shroud upper member 32 (described later) through a bracket (not illustrated). That is, the right wall part 25 is supported by the vehicle body through the subtank 94.

As illustrated in FIG. 1, the right wall part 25 has a divided structure comprised of two, upper and lower members of an upper right wall part 25u and a lower right wall part 25d.

The upper right wall part 25u and the lower right wall part 25d are attached to and supported by (not illustrated) the subtank 94, and as illustrated in FIG. 3, each of having a cover 250 made of synthetic resin as an outer cover, and a heat retention material 251 made of glass wool, urethane, etc. integrally provided to an inner surface of the cover 250. Note that FIG. 3 only illustrates the cover 250 and the heat retention material 251 of the lower right wall part 25d, and illustration of those of the upper right wall part 25u is omitted.

Meanwhile, as illustrated in FIGS. 1 to 5, a shroud 30 which holds the radiator or condenser as a heat exchanger is disposed forward of the engine so as to cover the radiator or condenser from the front.

Below, the shroud 30 as the front wall part 26 is described. As illustrated in FIGS. 1, 2 and 5, the shroud 30 is provided with the shroud panel 31 covering the radiator or condenser as the heat exchanger, and the shroud upper member 32 located above the shroud panel 31.

The shroud upper member 32 is formed by integrally coupling shroud upper member sides 32b to both ends of a shroud upper member center 32a in the vehicle width directions which is located at the center in the vehicle width directions. Both left and right ends of the left and right shroud upper member sides 32b and 32b are coupled to an apron (not illustrated).

As illustrated in FIGS. 1, 2, and 5, the shroud panel 31 is integrally formed in a rectangular frame shape by having an upper member 31U (shroud upper) which constitutes an upper side extending in the vehicle width directions, and a lower member 31D (shroud lower) which similarly constitutes a lower side, and a pair of left and right side members 31S and 31S (shroud side) which constitute sides, and as illustrated in FIGS. 1 to 3, which vertically couple both left and right ends of the upper member 31U and both left and right ends of the lower member 31D.

As illustrated in FIGS. 1 to 5, inside the rectangular frame shape of the shroud panel 31, rectangular openings 35 are formed penetrating in the vehicle longitudinal directions in the front view (view from the front to the rear of the vehicle). A center stay 33 extending in the vertical directions is disposed at the center of the shroud panel 31 in the vehicle width directions, and both upper and lower ends of the center stay 33 are integrally coupled to the upper member 31U and the lower member 31D, respectively.

Further, as illustrated in FIGS. 1, 2 and 5, cross stays 34a and 34b (an upper cross stay 34a and a lower cross stay 34b) extending in the vehicle width directions are disposed in upper and lower parts which are separated by a central part of the shroud panel 31 in the vertical directions. Both ends of the upper and lower cross stays 34a and 34b in the vehicle width directions are integrally coupled to a pair of left and right side members 31S (see FIGS. 1 and 2).

The plurality of (in this example, six) openings 35 (35a, 35b, and 35c) are formed inside the members 31U, 31D, 31S, and 31S by the center stay 33 and the upper and lower cross stays 34a and 34b which are provided in the shroud panel 31.

Specifically, the openings 35 is comprised of left and right upper row openings 35a formed above the upper cross stay 34a, left and right middle row openings 35b formed between the upper cross stay 34a and the lower cross stay 34b, and left and right lower row openings 35c formed below the lower cross stay 34b.

The shroud panel 31 is provided with a grille shutter 41 which opens and closes the openings 35 formed in the shroud panel 31 to adjust an air-introducing amount into the radiator and also function as the front wall part 26 (heat retention wall part) covering the front of the engine.

Moreover, as illustrated in FIG. 3, the shroud panel 31 is constructed so that a width Wa (Wal+War) of the openings 35 in the vehicle width directions is smaller than a width Wb of the front surface opening 7 in the vehicle width directions for introducing the traveling air of the bumper face 6 located forward of the shroud panel 31.

More specifically, the total width Wa of the left and right widths Wal and War of the pair of left and right upper row openings 35a, the total width of the pair of left and right middle row openings 35b, and the total width of the pair of left and right lower row openings 35 are all smaller than the width of the front surface opening 7 for introducing the traveling air.

Note that the total width Wa of the widths Wal and War of the pair of left and right upper row openings 35a is a width obtained by adding the width Wal of the left upper row opening 35a to the width War of the right upper row opening 35a. The same is applied to the total width of the pair of left and right middle row openings 35b, and the total width of the pair of left and right lower row openings 35c.

Moreover, the openings 35 of the shroud 30 may also be configured to have the vertical dimension smaller than the vertical dimension of the front surface opening 7 for introducing the traveling air of the bumper face 6, similar to the widths.

As illustrated in FIGS. 1 to 6, the shroud panel 31 is provided with a grille shutter unit 40 which supports (holds) a plurality of grille shutters 41 (hereinafter, referred to as "the shutters 41") so as to be pivotable (driven to be opened and closed), and the plurality of shutters 41 are assembled (attached) to the grille shutter unit 40 as a part thereof. Thus, the plurality of shutters 41 are provided to the shroud panel 31 so as to be openable and closable of the openings 35 according to an operating state of the vehicle.

The grille shutter unit 40 includes, in addition to the plurality of shutters 41 extending in the vehicle width directions, an actuator 55 (see FIG. 6) as a grille shutter actuator which drives to open and close (pivot) the shutters 41, pivot links 43a and 43b (see FIG. 6) which transmit a driving force of the actuator 55 to the shutters 41, and frames 440, 441, and 442 as shutter holding parts which are attached to the shroud panel 31 side and hold the shutters 41 and the pivot links 43a and 43b.

Figure 6:
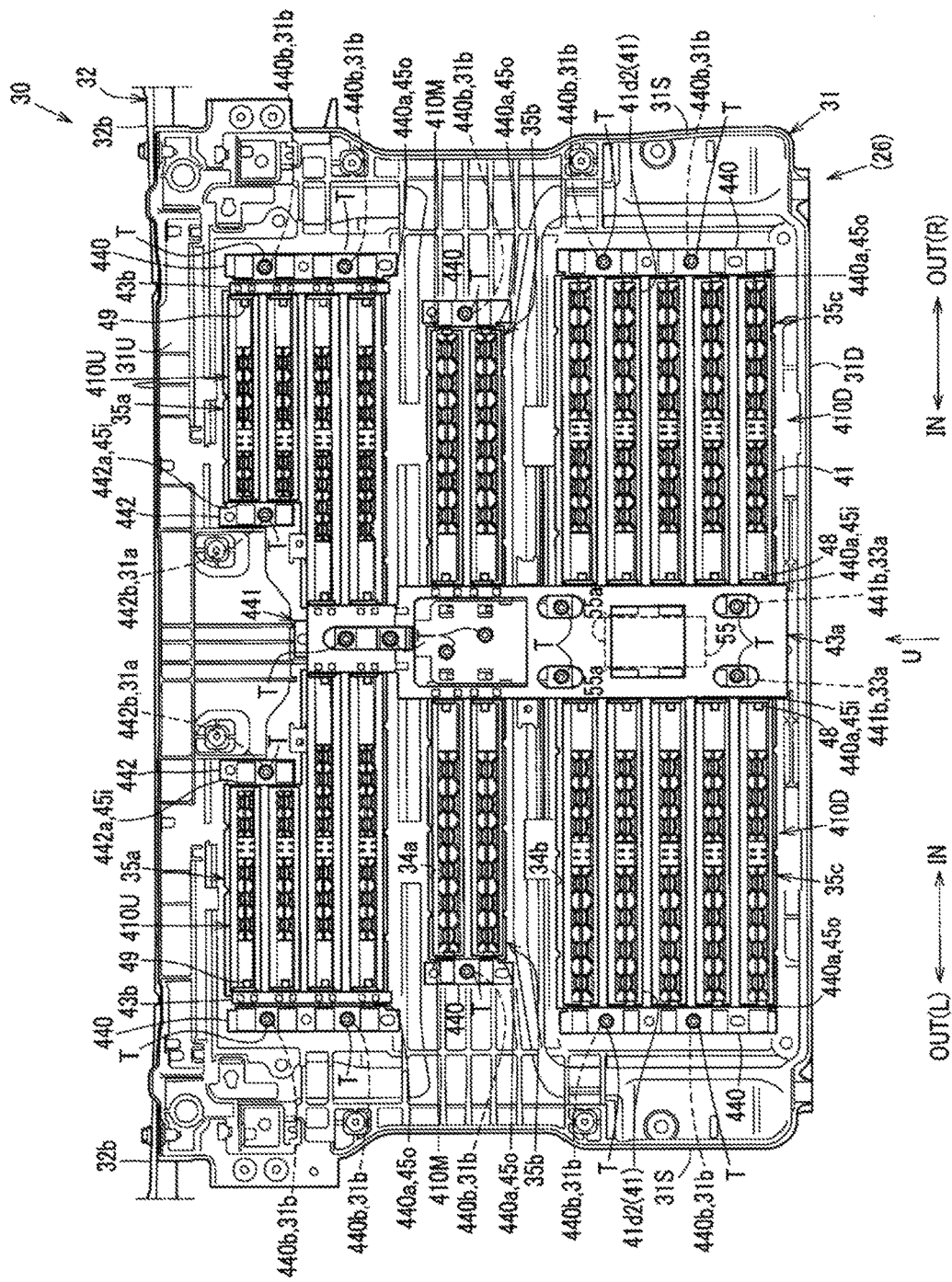
FIG. 6 is a rear view of a shroud panel.

As illustrated in FIG. 6, the grille shutter unit 40 is substantially laterally symmetrical with respect to a first center frame 441 (described later) located at the center in the vehicle width directions, and is attached to the shroud panel 31 from the rear side as will be described later (see FIGS. 3 to 6). Thus, each shutter 41 is provided to the rear side (back side) of the shroud panel 31 (see the same figures).

As illustrated in FIG. 6, the plurality of shutters 41 are correspondingly provided to the plurality of opening 35a, 35b, and 35c, and are capable of opening and closing the openings 35a, 35b, and 35c, respectively.

For example, the plurality of shutters 41 are comprised of left and right upper row shutter groups 410U provided corresponding to the left and right upper row openings 35a, left and right middle row shutter groups 410M similarly provided corresponding to the left and right middle row openings 35b, and left and right lower row shutter groups 410D provided corresponding to the left and right lower row openings 35c.

In this example, the upper row shutter groups 410U are comprised of four shutters 41, the middle row shutter groups 410M are comprised of two shutters 41, and the lower row shutter groups 410D are comprised of five shutters 41. These shutters 41 have widths corresponding to the widths of the openings 35a, 35b, and 35c, respectively, and are arranged parallel in the vertical directions.

As illustrated in FIG. 6, the frames 440, 441, and 442 are comprised of outer frames 440 which support shutter shafts 45o located outward of the shutters 41 in the vehicle width directions, respectively, and center frames 441 and 442 which support shutter shafts 45i located inward of the shutters 41 in the vehicle width directions.

Three outer frames 440 are provided on each of the left and right sides, corresponding to the left and right openings 35a, 35b, and 35c of the upper, middle, and lower rows. Shaft-support parts 440a which support (hold) the shutter shafts 45o located outward in the vehicle width directions at outer ends of the plurality of shutters 41 provided to the shutter groups 410U, 410M and 410D is provided, respectively.

On the other hand, as illustrated in FIG. 6, the center frames 441 and 442 are comprised of a first center frame 441 located at the center in the vehicle width directions, and a pair of left and right second center frames 442 provided above the first center frame 441.

The first center frame 441 is provided with the shaft-support parts 440a which support (hold) the shutter shafts 45i located inward in the vehicle width directions at inner ends of, the two lower shutters 41 of each of the left and right upper row shutter groups 410U, and the plurality of shutters 41 provided to the left and right middle row shutter groups 410M and left and right lower row shutter groups 410D (note that a second shutters 41d2 from the top in the lower row shutter groups 410D are excluded, and this shutter is referred to as "the lower row second shutters 41d2") (see FIG. 6).

Moreover, the actuator 55 is attached below the first center frame 441 (see FIG. 6). Although illustration is omitted, the actuator 55 is disposed in a space in the first center frame 441, opposing to the center stay 33 (see FIG. 2). The left and right lower row second shutters 41d2 are held by the outer frames 440 where the shutter shafts 45o located outward in the vehicle width directions are disposed in the lower row openings 35c, and the shutter shafts 45i located inward in the vehicle width directions are directly coupled to a drive shaft 55a (motor shaft) of the actuator 55 described above (see FIG. 6).

The pair of left and right second center frames 442 are provided with shaft-support parts 442a which support (hold) the shutter shafts 45i located inward in the vehicle width directions, corresponding to the two, upper shutters 41 of each of the left and right upper row shutter groups 410U (see FIG. 6).

Next, attachment of the frames 440, 441, and 442 to the shroud panel 31 is described. As illustrated in FIG. 6, the outer frames 440 described above are attached to outer edges in the vehicle width directions of the left and right openings 35a, 35b, and 35c from the rear side of the shroud panel 31.

Figure 4:
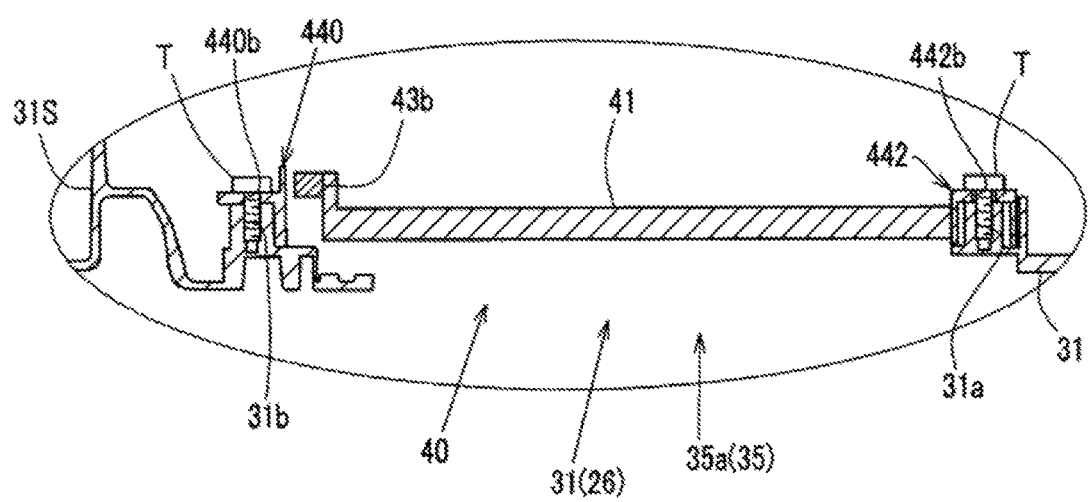
FIG. 4 is an enlarged view of X part of FIG. 3.

More specifically, as illustrated in FIGS. 4 and 6, through-holes 440b are formed at upper and lower locations of the left and right, upper and lower row outer frames 440, and vertically intermediate locations of the left and right middle row outer frames 440, and screw insert holes 31b are formed in the shroud panel 31 at locations corresponding to the through-holes 440b.

Self-tapping screws T are inserted into the screw insert holes 31b and the corresponding through-holes 440b from the rear side to fixedly fasten the upper, middle, and lower row outer frames 440 integrally to the shroud panel 31 from the rear side.

As illustrated in FIG. 6, the first center frame 441 described above is attached to the center stay 33 in the shroud panel 31 from the rear side at a plurality of locations. Thus, the first center frame 441 is vertically oriented at a position corresponding to the center stay 33 ranging over the upper and lower cross stays 34a and 34b in the front view.

More specifically, a plurality of (in this example, eight) through-holes 441b are arranged in the first center frame 441 at locations substantially along a vertical line (see FIG. 6). On the other hand, as illustrated in the same figure, screw insert holes 33a are formed at locations corresponding to the through-holes 441b formed in the first center frame 441 in the front view from the rear side of the center stay 33.

As illustrated in the same figure, self-tapping screws T are inserted into the screw insert holes 33a and the corresponding through-holes 441b from the rear side to fixedly fasten the first center frame 441 integrally to the center stay 33.

As illustrated in FIG. 6, the second center frames 442 described above are attached to inner edges in the vehicle width directions of the upper row openings 35a from the rear side of the shroud panel 31.

More specifically, as illustrated in FIGS. 4 and 6, through-holes 442b are formed in the second center frames 442, and as illustrated in the same figure, screw insert holes 31a are formed at locations of the shroud panel 31 corresponding to the through-holes 442b formed in the second center frames 442.

Self-tapping screws T are inserted into the screw insert holes 31a and the through-holes 442b from the rear side to fixedly fasten the second center frames 442 integrally to the shroud panel 31.

As described above, in the grille shutter unit 40, the pair of left and right, upper, middle, and lower row outer frames 440, the first center frame 441, and the pair of left and right second center frames 442 are directly attached to the shroud panel 31.

As illustrated in FIG. 6, the pivot links 43a and 43b are comprised of the pair of left and right first pivot links 43a which are adjacently disposed at least at both left and right sides of the first center frame 441, and which are provided to the inner edges in the vehicle width directions of the upper, middle, and lower row openings 35a, 35b, and 35c, and the pair of left and right second pivot links 43b which are adjacently disposed to the upper row outer frames 440 inwardly in the vehicle width directions, and which are provided to the outer edges in the vehicle width directions of the left and right upper row openings 35a.

On the other hand, in each shutter 41, although the shutter shafts 45i and 45o are provided to the inner and outer ends in the vehicle width directions, pivot shafts 48 and 49 pivotally supported by the pivot links 43a and 43b are additionally provided to the opposite ends in the vehicle width directions from the pivot links 43a and 43b (see FIG. 6).

The lower row second shutters 41d2 are pivotably constructed by being directly coupled to the drive shaft 55a of the actuator 55, other shutters 41 are pivotably constructed by the driving force of the actuator 55 being transmitted thereto through at least the first pivot link 43*a* among the first pivot link 43*a* and the second pivot link 43*b*.

The vehicle of this embodiment is configured so that the shutters 41 are opened and closed according to the operating state of the vehicle (e.g., the openings 35 are opened at a high-speed travel etc.). The vehicle is provided with a grille shutter control device 50 which controls the shutters 41 to be closed when the ignition is off.

Figure 7:
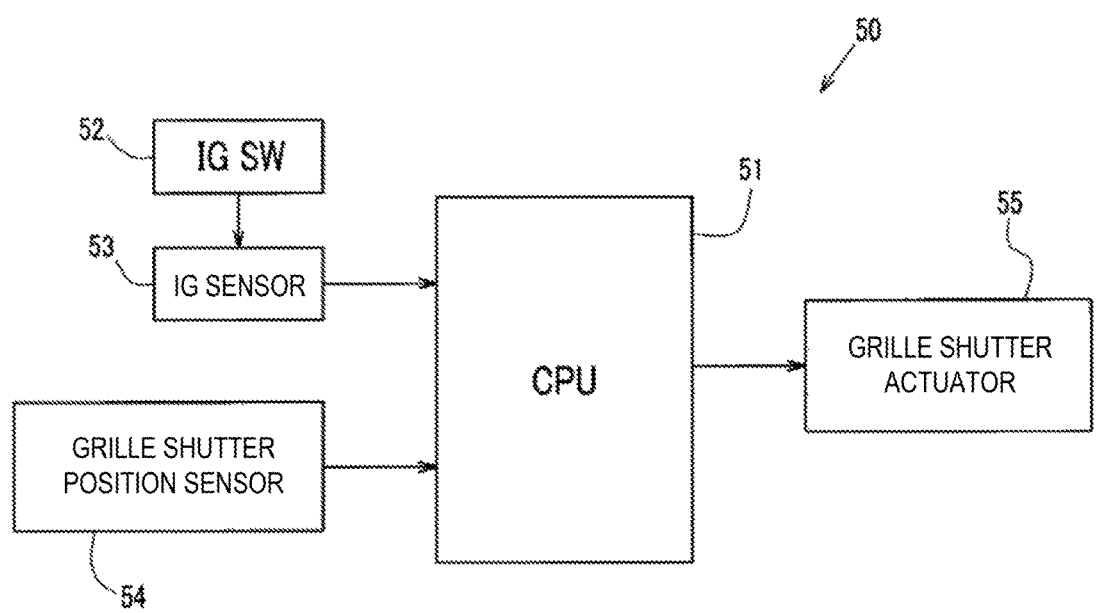
FIG. 7 is a block diagram illustrating an electric structure of a grille shutter control device.

For example, the grille shutter control device 50 is mounted on the vehicle, and as illustrated in FIG. 7, the control device includes a CPU (Central Processing Unit) 51 which controls the opening and closing of the shutters 41, an ignition sensor 53 which detects, for example, an ON/OFF state of the ignition (IG) of an ignition switch 52 and outputs a detection signal to the CPU 51, a grille shutter position sensor 54 which detects open/closed states of the shutters 41, and the actuator 55 which opens and closes (pivots) the shutters 41. The ignition sensor 53, the grille shutter position sensor 54, and the actuator 55 are electrically connected with the CPU 51.

Figure 8:
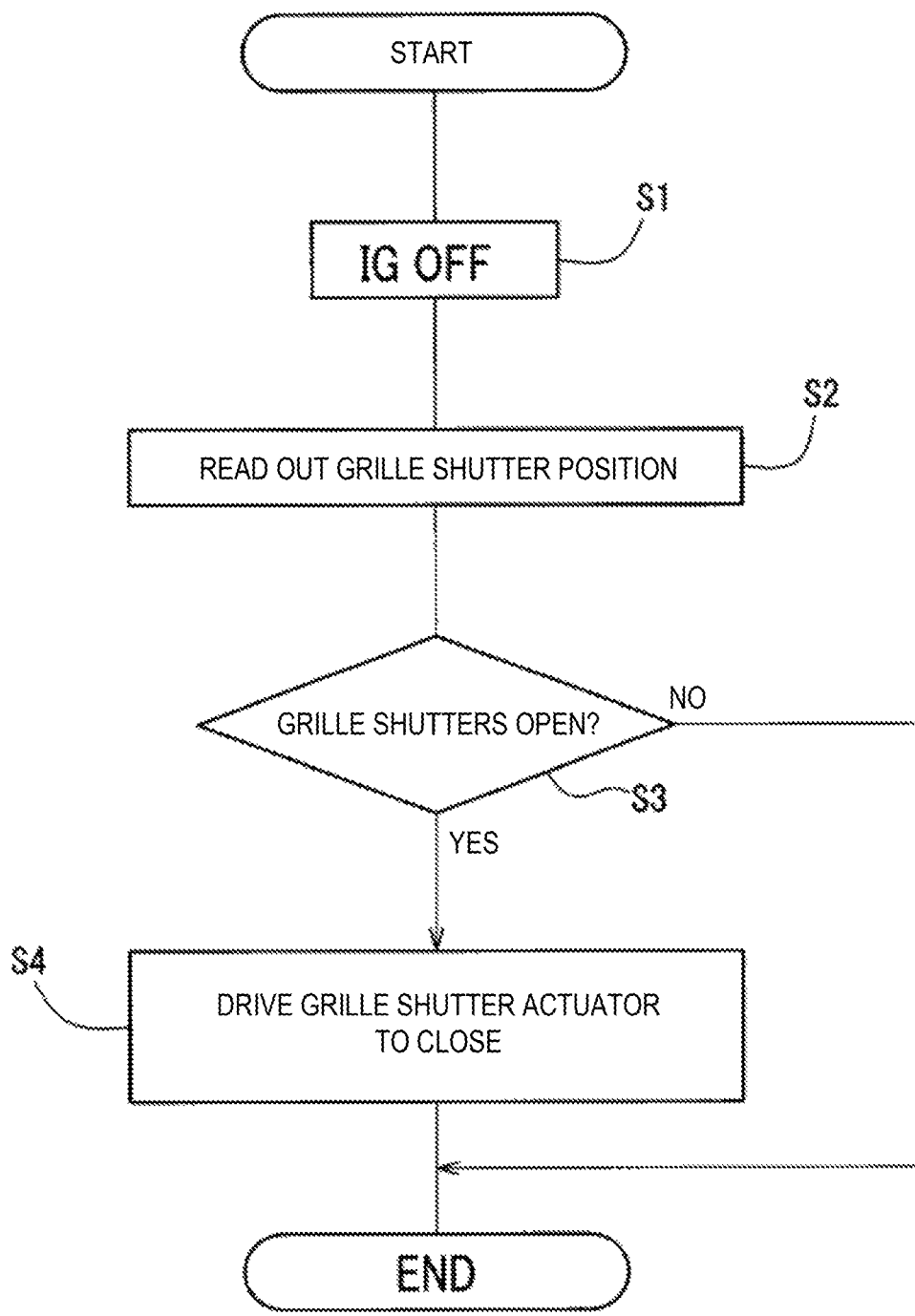
FIG. 8 is a flowchart illustrating grille shutter control processing when an ignition is OFF.

A grille shutter control using the grille shutter control device 50 is described using a flowchart of FIG. 8. First, if the ignition sensor 53 detects that the ignition switch 52 is turned off (Step 1), the CPU 51 reads out a grille shutter position signal detected by the grille shutter position sensor 54 (Step 2).

As a result, if the shutters 41 are in an open state (Step 3: Yes), the CPU 51 executes a control of the actuator 55 so that the shutters 41 are pivoted to be in a closed state (Step 4).

On the other hand, if the shutters 41 is in the closed state when the ignition switch 52 is OFF (Step 3: No), the CPU 51 executes a control to maintain the shutters 41 being in the closed state.

Thus, in the state where the openings 35 are closed by the shutters 41, since the shroud panel 31 also functions as the front wall part 26 which constitutes the heat retention wall parts covering the engine from the front side, the upper lid part 22, and the shroud panel 31 which closes the openings 35 by the shutters 41 are capable of an efficient engine encapsulation ranging from above to front.

As described above, the heat retention structure of the engine of this embodiment is provided with the upper lid part 22 covering the engine at least from above, and the shroud panel 31 provided to the shroud 30 is disposed forward of the engine (see FIGS. 1 to 3 and 5). The shroud panel 31 is constructed into the frame shape having the openings 35, and the front end 22*f* of the upper lid part 22 is placed on the upper member 31U as the upper side of the shroud panel 31 (see FIGS. 1 and 5). The shutters 41 are provided to the shroud panel 31 so that they open and close the openings 35 according to the operating state of the vehicle, and when the ignition is off, they close the openings 35 (see FIGS. 1 to 3, 5, 7, and 8).

According to this structure, the efficient encapsulation from above to front is possible by the upper lid part 22, and the shroud panel 31 provided with the shutters 41.

In the meantime, in the conventional structure in which, for example, a casing of a frame shape, such as a duct, is additionally provided forward of a shroud panel, and the shutters are provided to the frame casing without being provided to the shroud panel, since a gap is produced in the vehicle longitudinal directions between the frame casing which holds the shutters and the shroud panel, heat may possibly escape through the gap out of the space surrounded by the heat retention members inside the engine bay.

On the other hand, in this embodiment, since the shutters 41 are provided to the shroud panel 31, the shroud panel 31 can be used as a wall for preventing the heat from escaping (i.e., the heat retention wall part). Further, since the front end 22*f* of the upper lid part 22 is placed on the upper member 31U of the shroud panel 31 (see FIG. 5), the engine can be covered without producing any gap for heat escape in the shroud panel 31 itself, or between the shroud panel 31 and the upper lid part 22.

Therefore, the efficient encapsulation from above to front is possible in terms of the heat retention efficiency by the upper lid part 22, and the shroud panel 31 provided with the shutters 41.

Further, in the conventional structure in which the frame casing which holds the shutters is disposed forward of the shroud panel, the number of components increases because the frame casing is separately or additionally provided, and the bumper beam 12 extending in the vehicle width directions is disposed forward of the shroud panel. Therefore, the frame casing for holding the shutters may interfere with the bumper beam 12. In order to avoid this, the frame casing must adopt a structure in which it is divided vertically to avoid the interference with the bumper beam 12, resulting in a complicated structure.

On the other hand, in this embodiment, since the shutters 41 are provided to the shroud panel 31, the frame casing is unnecessary and the number of components can be reduced accordingly. Therefore, efficient encapsulation is also possible in terms of the cost and the weight, without having the complicated structure.

In one embodiment of the present disclosure, the shutters 41 are provided to the shroud panel 31 from the rear side (see FIGS. 3, 4, and 6).

According to this structure, since the shutters 41 are provided to the shroud panel 31 from the rear side, the shutters 41 can be disposed closer to the engine than a case where they are provided from the front side.

That is, in the state where the engine is encapsulated from above to front by the upper lid part 22 and the shroud panel 31, since the shutters 41 are disposed from the space where the engine is mounted, with respect to the shroud panel 31, the heat escape forward of the engine can be prevented, resulting in higher heat retention efficiency forward of the engine.

In one embodiment of the present disclosure, the plurality of openings 35 (35*a*, 35*b*, and 35*c*) are formed in the shroud panel 31. The grille shutter unit 40 is provided which has the frames 440, 441 and 442 as the shutter holding parts which hold the shutters 41 for the respective openings 35*a*, 35*b*, and 35*c*. In the grille shutter unit 40, the plurality of frames 440, 441, and 442 are directly attached to the shroud panel 31 (see FIGS. 3, 4, and 6).

According to this structure, since the plurality of frames 440, 441, and 442 which hold the shutters 41 for the respective openings 35*a*, 35*b*, and 35*c* are directly attached to the shroud panel 31, the shutters 41 can be attached to the shroud panel 31 without any gaps, thereby the heat escape can effectively be reduced.

Further, since the plurality of shutters 41 are attached to the shroud panel 31 through the frames 440, 441, and 442 provided for the respective openings 35, the large-scale frame casing (shutter holding member) for holding the shutters 41 does not need to be provided separately or additionally. Thus, an increase in the weight of the frames 440, 441, and 442, i.e., the grille shutter unit 40, is suppressed, while holding the shutters 41 efficiently. Therefore, the weight of the holding structure of the shutters 41 can be reduced, while suppressing the heat escape.

In addition, since the shutters 41 are held (pivotally supported) by the respective frames 440, 441, and 442 so that they are disposed dividedly into the shutter groups 410U, 410M, and 410D for the respective opening 35a, 35b, and 35c, and the frames 440, 441, and 442 are assembled integrally as the grille shutter unit 40, the shutters 41 will not fall apart and can easily be assembled as one package when the plurality of shutters 41 are assembled to the shroud panel 31.

In one embodiment of the present disclosure, the width Wa in the vehicle width directions of the openings 35 of the shroud 30 is smaller than the width Wb of the front surface opening 7 in the vehicle width directions for introducing the traveling air (traveling air introducing opening) of the bumper face 6 located forward of the shroud 30 (see FIG. 3).

According to this structure, upon covering the front of the engine by the shutters, since the shutters 41 provided to the shroud 30 covering the openings 35 can reduce the widths of the shutters 41 rather than the shutters provided to the bumper face 6 and covering the front surface opening 7. Therefore, the front of the engine can easily be covered, the heat retention structure forward of the engine can be simplified, and the weight and the cost can be reduced.

Further, since the bumper face 6 constitutes the external surface of the vehicle body front part, the shape and size of the front surface opening 7 of the bumper face 6 differ according to the design of the vehicle body. For this reason, in the structure in which the front surface opening 7 is opened and closed by the shutters provided to the bumper face 6, it is necessary to change the size and layout of the shutters as the shape and size of the front surface opening 7 are changed.

On the other hand, since this embodiment is provided with the shutters 41 which open and close the openings 35 of the shroud 30, the front of the engine can be covered to be openable and closeable without the necessity of changing the size and layout of the shutters 41 as the shape and size of the front surface opening 7 are changed.

The present disclosure is not limited only to the structures of this embodiment and may be implemented in a variety of forms.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

6 Front Bumper Face (Bumper Face)
7 Front Surface Opening (Traveling Air Introducing Opening)
22 Upper Lid Part
22f Front End of Upper Lid Part
31 Shroud Panel
31U Upper Member (Upper Side of Shroud)
35 (35a, 35b and 35c) Opening
40 Grille Shutter Unit
41 Grille Shutter
440, 441 and 442 Frame (Shutter Holding Part)
Wa (Wa1+War) Width of Opening of Shroud Panel in Vehicle Width Directions (Opening Width of Shroud in Vehicle Width Directions)
Wb Width of Front Surface Opening in Vehicle Width Directions (Width of Traveling Air Introducing Opening in Vehicle Width Directions)

What is claimed is:

1. A vehicle, comprising:
    an engine bay having an upper wall, side walls, a front wall, and a rear wall;
    an engine disposed inside the engine bay;
    an upper lid part disposed inside the engine bay and covering the engine from above;
    a shroud disposed inside the engine bay and formed in a frame shape having an opening disposed forward of the engine; and
    a grille shutter provided to the shroud and configured to open and close the opening,
    wherein a front end of the upper lid part is placed on an upper side of the shroud,
    wherein the grille shutter is closed when an ignition is off,
    wherein in a vehicle width direction, a first width that is a width of the side walls and a second width that is a width of the shroud are smaller than a third width that is a width of a traveling air introducing opening of a bumper face being located forward of the shroud, and
    wherein in a vehicle height direction, a top end of the shroud is higher than an upper end of the traveling air introducing opening.

2. The vehicle of claim 1, further comprising a dedicated heat retention member disposed inside the engine bay, and comprised of the upper lid part, the shroud, the grille shutter, and side wall parts covering sides of the engine.

3. The vehicle of claim 1, wherein the grille shutter is provided to the shroud at a rear side.

4. The vehicle of claim 1, wherein the opening formed in the shroud includes a plurality of openings, and the grille shutter includes a plurality of grille shutters corresponding to the plurality of openings,
    wherein the vehicle comprises a grille shutter unit having a plurality of shutter holding parts holding the grille shutters,
    wherein the plurality of shutter holding parts are directly attached to the shroud.

* * * * *